United States Patent
Adam et al.

(10) Patent No.: US 8,353,214 B2
(45) Date of Patent: Jan. 15, 2013

(54) PRESSURE SENSOR FOR SIDE-IMPACT SENSING AND METHOD FOR FORMING A SURFACE OF A PROTECTIVE MATERIAL FOR A PRESSURE SENSOR

(75) Inventors: Boris Adam, Gaeufelden (DE); Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 12/308,474

(22) PCT Filed: Jul. 30, 2007

(86) PCT No.: PCT/EP2007/057839
§ 371 (c)(1),
(2), (4) Date: Aug. 13, 2010

(87) PCT Pub. No.: WO2008/031670
PCT Pub. Date: Mar. 20, 2008

(65) Prior Publication Data
US 2010/0307253 A1 Dec. 9, 2010

(30) Foreign Application Priority Data
Sep. 15, 2006 (DE) .......................... 10 2006 043 323

(51) Int. Cl.
*G01L 7/00* (2006.01)
(52) U.S. Cl. ........................................................ 73/706
(58) Field of Classification Search .................... 73/700, 73/706
See application file for complete search history.

(56) References Cited

U.S. PATENT DOCUMENTS

| 5,412,994 | A | | 5/1995 | Cook et al. |
|---|---|---|---|---|
| 5,600,071 | A | * | 2/1997 | Sooriakumar et al. ........... 73/721 |
| 5,724,229 | A | * | 3/1998 | Tustaniwskyi et al. ........ 361/719 |
| 6,647,793 | B2 | | 11/2003 | Dirmeyer et al. |
| 7,162,927 | B1 | * | 1/2007 | Selvan et al. .................... 73/753 |
| 7,872,686 | B2 | * | 1/2011 | Kale et al. ....................... 348/374 |
| 2010/0290661 | A1 | * | 11/2010 | Baumhauer et al. ........... 381/361 |

FOREIGN PATENT DOCUMENTS

| DE | 19923985 | 12/2000 |
|---|---|---|
| DE | 10309713 | 9/2004 |
| DE | 10333964 | 2/2005 |
| JP | 57-147027 | 9/1982 |
| JP | 8-324379 | 12/1996 |
| JP | 10-132577 | 5/1998 |
| JP | 10-170379 | 6/1998 |
| JP | 10-170380 | 6/1998 |
| WO | WO 00/71978 | 11/2000 |

OTHER PUBLICATIONS

International Search Report, PCT International Patent Application No. PCT/EP2007/057839, dated Nov. 28, 2007.

* cited by examiner

*Primary Examiner* — Max Noori
(74) *Attorney, Agent, or Firm* — Kenyon & Kenyon LLP

(57) ABSTRACT

A pressure sensor for side-impact sensing and a method for forming a surface of a protective material for a pressure sensor are provided. In this context, at least one integrated circuit is completely surrounded in a protective material, and the protective material has a cavity into which at least one pressure sensor element is installed, a surface of the protective material being formed such that a pressure-entry channel is formed by the interaction of the surface with at least one housing part. The pressure-entry channel allows for a lateral access to the at least one pressure sensor element.

9 Claims, 4 Drawing Sheets

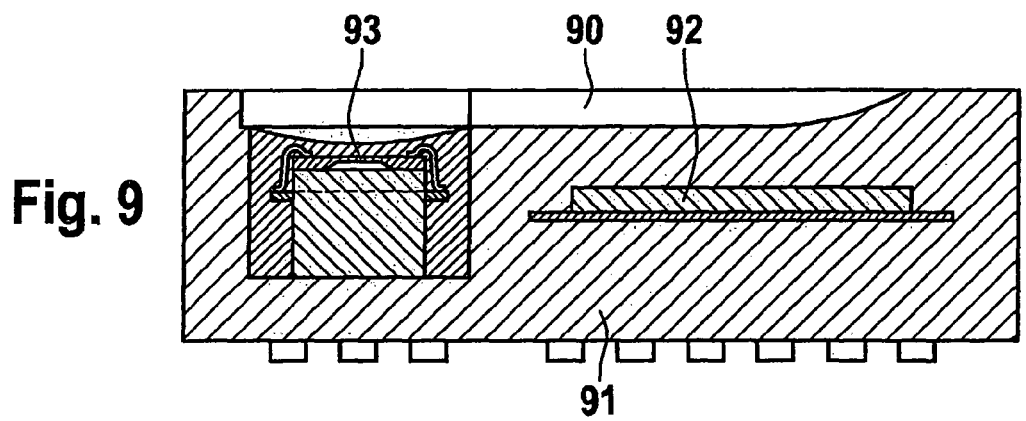
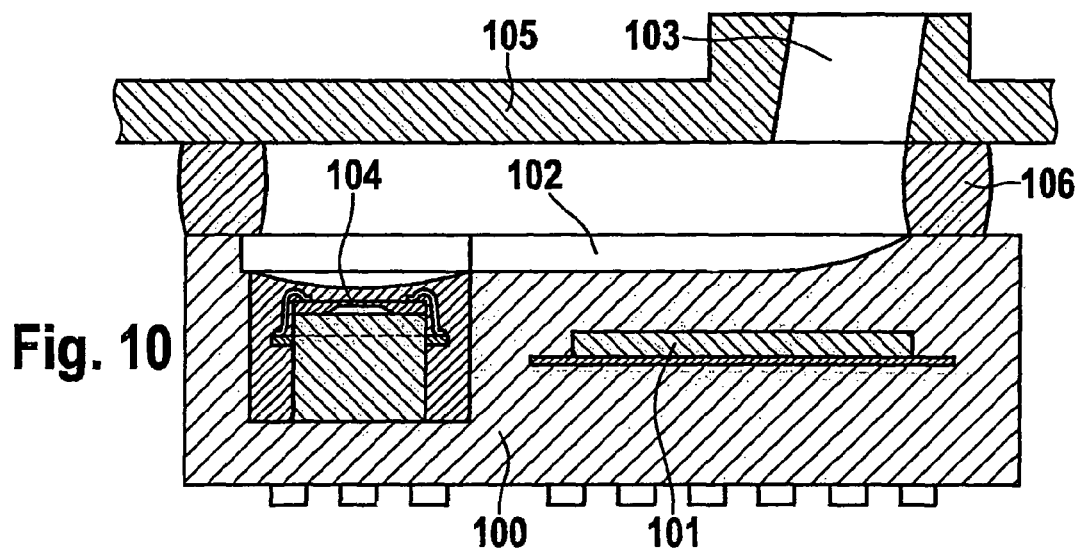
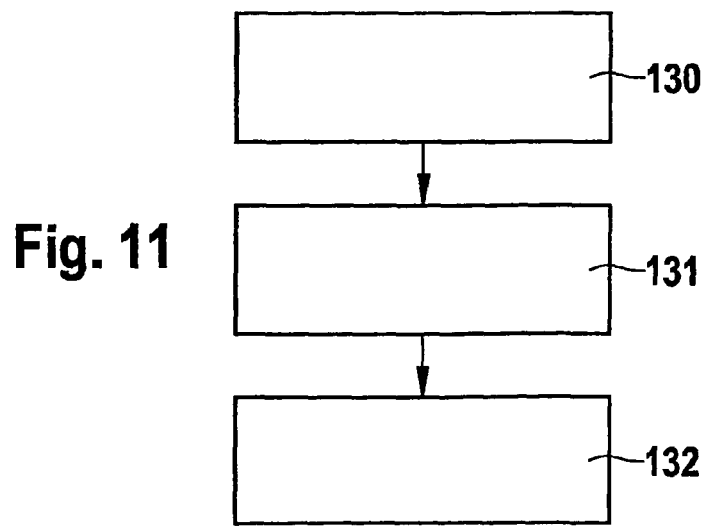

PRESSURE SENSOR FOR SIDE-IMPACT SENSING AND METHOD FOR FORMING A SURFACE OF A PROTECTIVE MATERIAL FOR A PRESSURE SENSOR

FIELD OF THE INVENTION

The present invention relates to a pressure sensor for side-impact sensing and a method for forming a surface of a protective material for a pressure sensor.

BACKGROUND INFORMATION

A pressure sensor for side-impact sensing in which a channel allows the air to flow directly onto a sensor element is described in German Patent Application No. DE 199 23 985 A1. In this context, the sensor element can be protected by a diaphragm. The channel is realized with the aid of a plurality of housing components.

SUMMARY

A pressure sensor for side-impact sensing according to an example embodiment of the present invention and an example method for forming a surface of a protective material for a pressure sensor may have the advantage that the entire design of the pressure sensor is simplified by forming the surface of the protective material such that the interaction with a housing part already achieves an entry channel that enables a lateral, offset access to the pressure sensor element. In this way, the sensor housing is also simplified significantly and is accordingly more cost-effective.

The manufacturing process is also accordingly simple to design since a tool for creating the corresponding surface is manufactured once and then may be used over and over again.

In particular, the lateral access makes it possible to minimize or even exclude the direct influence of corrosive media like moisture and also the direct influence of mechanical influences.

The pressure-entry channel may be designed such that condensed water may easily flow outside. This may be achieved by slants, curvatures, tapering, etc.

In particular, the housing cover is simplified since it only has to have one opening.

The design of the pressure-entry channel reliably prevents mechanical damage to the pressure sensor element in the assembled state. The example pressure sensor according to the present invention allows for the access opening to be produced in the floor of the surrounding overall housing as well, since it simplifies the assembly of the pressure sensor in the vehicle.

On the whole, the surface of the protective material, for example, epoxy, may be shaped freely, and the forming according to an example embodiment of the present invention may occur in the manufacturing step that is in any event provided.

The protective material may be a resin like epoxy or a plastic. The integrated switching circuit, which is designed as an ASIC in the case at hand, provides for the pressure signal to be conditioned and transmitted to a control unit.

The pressure sensor element, of which even a plurality may be provided, as may a plurality of integrated circuits, is normally designed micromechanically, a change in pressure expressing itself, for example, as a change in resistance of a Wheatstone measuring bridge, which is digitized as a change in voltage after the amplification. In this context, the pressure sensor element is disposed subsequently in what is known as a cavity, that is, an opening or recess in the protective material. The pressure-entry channel is ultimately formed by the interaction with a standard housing part, such as a cover, or an overall housing. In this instance, the surface of the protective material nevertheless has a clear structure, in particular a recess that leads to the pressure sensor element. This channel according to an example embodiment of the present invention may widen toward the pressure sensor element.

It may be particularly advantageous if next to the protective material, a cover is provided as the housing part that has a first opening, so that together with the protective material this cover forms a first housing of the pressure sensor. In this context, the cover is then preferably connected to the protective material so that the cover is secured directly above on the protective material and provides the covering for the pressure-entry channel. Preferably, a recess in the protective material provides the actual pressure-entry channel.

Additionally or alternatively, it is possible for the protective material having the cavity and the integrated circuit to be disposed in a second housing that surrounds the protective material. This second housing has a second opening to form a pressure-entry channel with the surface of the protective material. If both housings exist, then the first and the second housing are connected via a first seal between the first and the second opening. If only the second housing exists, then the protective material is connected with this second housing a corresponding seal.

Preferably, the protective material is injection-molded or processed using a transfer-molding method. For example, in one molding process it completely surrounds the at least one integrated circuit, while a cavity for the pressure sensor element is formed by a tool, which also simultaneously forms the surface of the protective material such that the pressure-entry channel is created for a lateral access to the pressure-sensor element. The housing produced in this manner thus constitutes a combination of a premold housing and a mold housing, the arrangement in this application case advantageously being produced side by side. The cavity in the premold housing part makes it possible to install the sensor element subsequently.

The surface of this housing is formed during the molding process through the forming by the tool.

Exemplary embodiments of the present invention are illustrated in the figures and explained in greater detail below.

BRIEF DESCRIPTION OF THE DRAWINGS

FIG. 9 shows a sectional view of the second variant, with a sensor element and ASIC.

FIG. 10 shows the second variant in the installed state with a surrounding housing.

FIG. 11 shows a flow chart of the example method according to the present invention.

DETAILED DESCRIPTION OF EXAMPLE EMBODIMENTS

Figure 1:
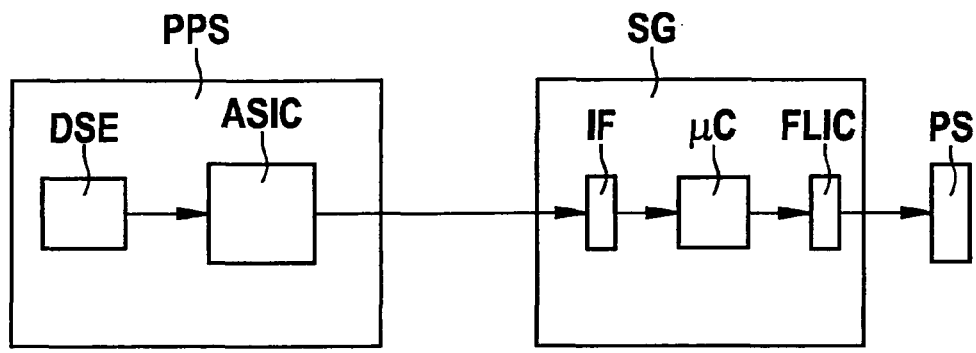
FIG. 1 shows a block diagram of the example pressure sensor with connected components.

FIG. 1 shows in a block diagram the interaction between the example pressure sensor according to the present invention and additional components of a personal protection system in a vehicle. Pressure sensor PPS has pressure sensor element DSE and an integrated circuit ASIC. A plurality of pressure sensor elements and/or a plurality of integrated circuits may exist. The pressure sensor element, which is manufactured micromechanically, as shown above, measures fluctuations in air pressure, since such fluctuations in air pressure may be used for sensing side impact in a lateral part of a vehicle. In the process, a portion of an adiabatic increase in air pressure may also be detected when the volume is compressed in the lateral part. The integrated circuit ensures that the pressure sensor signal is processed, that is, amplified, digitized, and sent via a line to a control unit SG, which triggers one or multiple personal protection means PS.

In the event of a side impact, a side-impact protection device, such as a lateral airbag or other conventional protection devices for side impact, are triggered. The pressure sensor data are received in control unit SG via an interface IF that is designed as hardware in the case at hand. It is possible for the microcontroller to directly receive these data. Microcontroller μC is the central element of control unit SG. Microcontroller μC executes a triggering algorithm on the measured pressure sensor data. Instead of a microcontroller, other processor types, ASICs, or discrete modules may also be used as an evaluation circuit. Microcontroller μC transmits a trigger signal to a control circuit FLIC as a function of the evaluation of the pressure sensor signals. As a function of the trigger signal, this control circuit brings about an activation of the personal protective means PS. To this end, control circuit FLIC has corresponding evaluation modules in order to be able to evaluate the software instruction of microcontroller μC. Here, parallel evaluations, in particular a plausibalization, are left out for the sake of simplicity, as are other components that may be necessary for operating control unit SG, but that do not contribute to understanding the present invention.

According to the example embodiment of the present invention, the pressure-entry channel for pressure sensor element DSE is achieved through the shaping of the surface of the protective material in cooperation with an additional housing part such as a cover or a housing surrounding the protective material. This represents a particularly simple implementation of such a pressure-entry channel.

Figure 2:
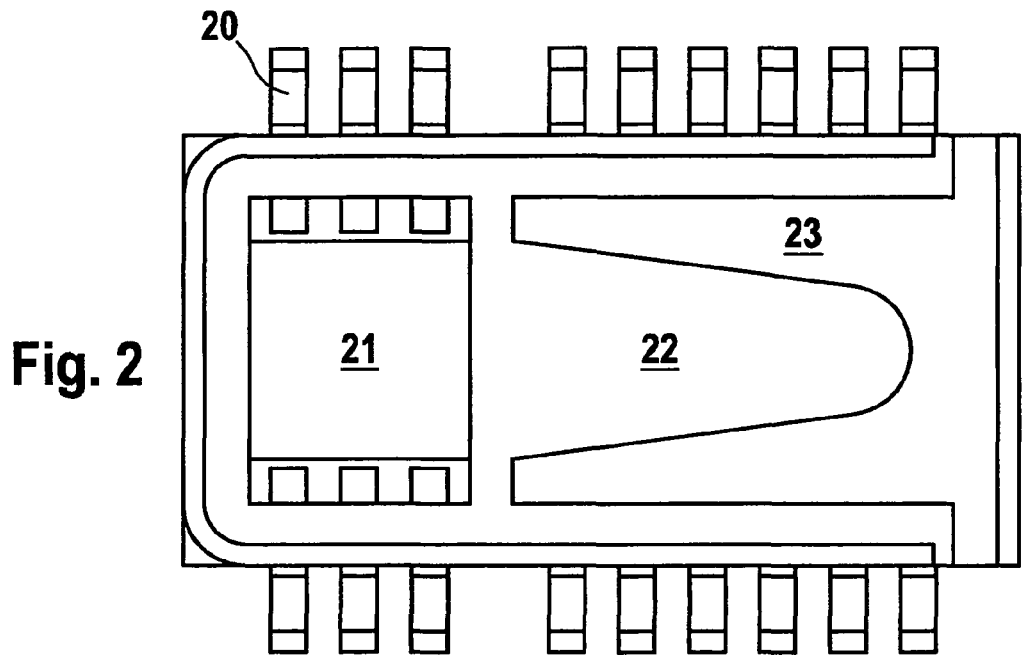
FIG. 2 shows a first top view on a first variant of the pressure sensor according to the present invention, but without sensor element.

FIG. 2 shows a first variant in a top view. A lead frame 20, which may take the form of a carrier strip, for example, is molded with respect to an integrated circuit, a cavity 21 being provided in an additional method step, into which the pressure sensor element is installed in an additional method step. During the molding, this cavity 21 and also a pressure-entry channel 22 is produced so that a recess develops in the protective material, in this case an epoxy that was injected, relative to the surface of protective material 23. In particular, the diameter of this pressure-entry channel 22 expands toward cavity 21 in order provide a full flow to the pressure sensor element across the entire width. The opposite end of this pressure-entry channel 22 is designed as a semicircle in order to correspond to a pressure-entry opening in a housing. The three pins respectively disposed on the top and bottom of the left side are assigned to the pressure-sensor element in cavity 21 not shown in FIG. 2, while the six pins respectively set apart on top and bottom respectively are assigned to the integrated circuit.

Figure 3:
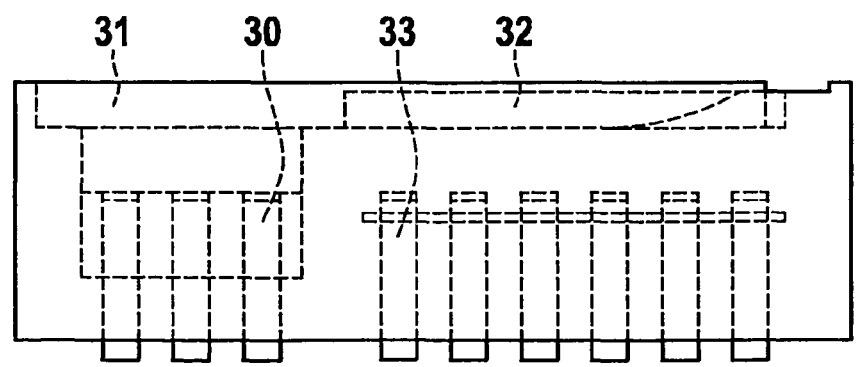
FIG. 3 shows a lateral view into the first variant, but without a sensor element and ASIC.

FIG. 3 shows a lateral view of or a lateral view through this first variant. Lead frame 30 of the pressure sensor element is covered and therefore illustrated with a dotted line. The fully molded-in lead frame 33 of the integrated circuit is shown in the same way. Pressure-entry channel 32 leads to an opening 31 above the pressure sensor element.

Figure 4:
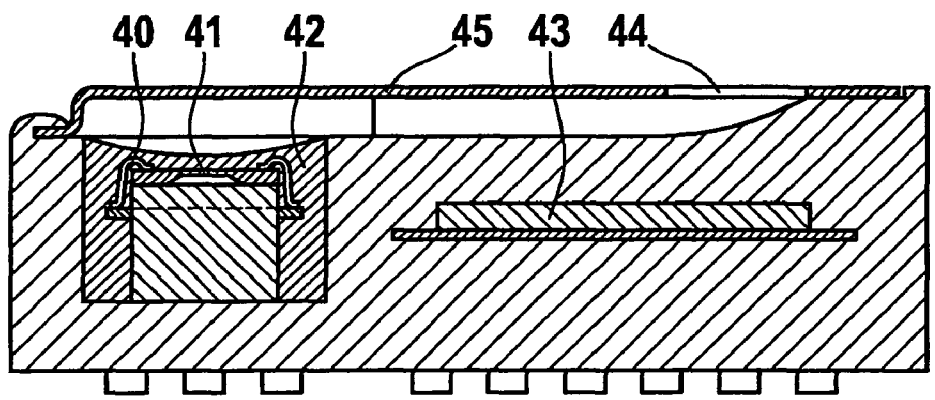
FIG. 4 shows a sectional view of the first variant, with sensor element and ASIC.

FIG. 4 shows a sectional view of the first variant. In the case at hand, an ASIC 43 is fully molded in, here by an epoxy. However, it is also possible to use plastics like PEEK or LCP. A micromechanical pressure sensor element 41 is fixed in the cavity, preferably using an adhesive agent. A housing cover 45 secured to the housing is located above the cavity and recess 22, which housing cover 45 constitutes pressure-entry channel 32 together with the housing. This housing cover 45 has an opening 44, through which the air pressure may enter the pressure-entry channel in order to laterally flow to sensor element 41. Pressure sensor element 41 is surrounded by a passivating material 42, which forms a thin layer above the pressure-sensitive sensor diaphragm. Bonding wires 40 are likewise visible, which connect sensor 41 to the leads present in the cavity and thus to the outside world.

Figure 5:
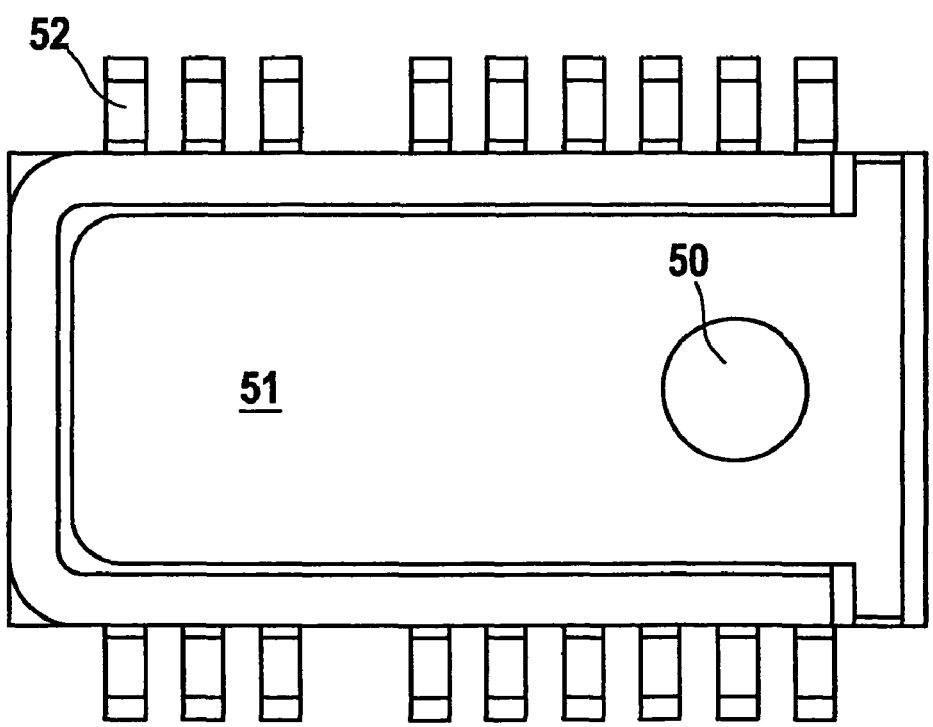
FIG. 5 shows an additional top view on the first variant with cover.

FIG. 5 shows the first variant having a housing cover in top view. Again, lead frame 52 and housing cover 51 (=45) having an access opening 50 (=44) are visible. The simple construction of this first variant is clear, it being possible to use simply a standard cover as a housing part. The pressure-entry channel is produced at the same time as the cavity for the pressure-sensor element.

Figure 6:
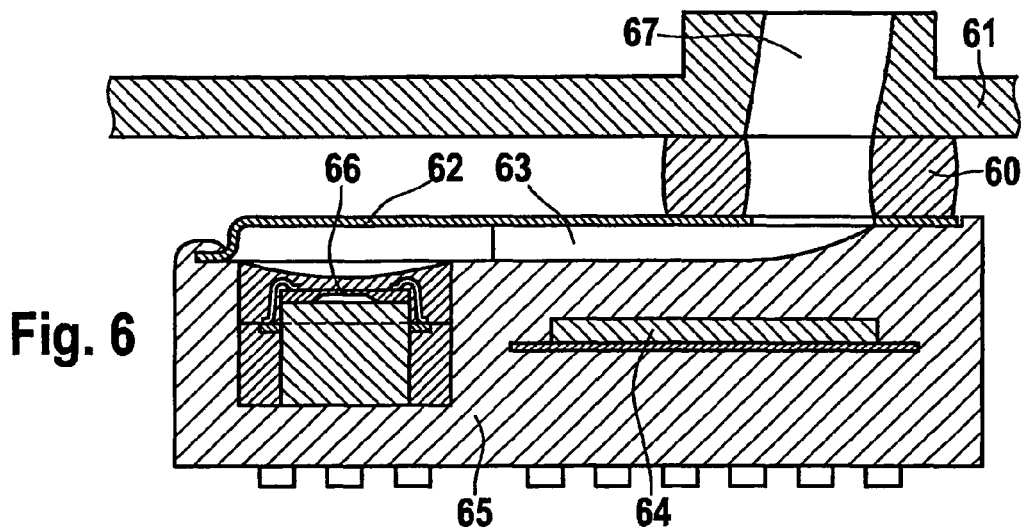
FIG. 6 shows an interaction between the first and second housing of the variant according to the present invention.

FIG. 6 shows a lateral section of the first variant and a connection via a seal to the second housing, which surrounds the protective material together with the first housing. This second housing 61, made of metal, for example, has a pressure-entry 67 that is led to pressure-entry channel 63 through seal 60. Housing cover 62 protects this channel 63 and forms it through its presence. Housing cover 62 is permanently attached to protective material 65. Pressure-entry channel 63 allows for a lateral flow to pressure sensor element 66. An integrated circuit 64 that takes over the signal conditioning and transmission of the pressure sensor signal is completely molded in.

Figure 7:
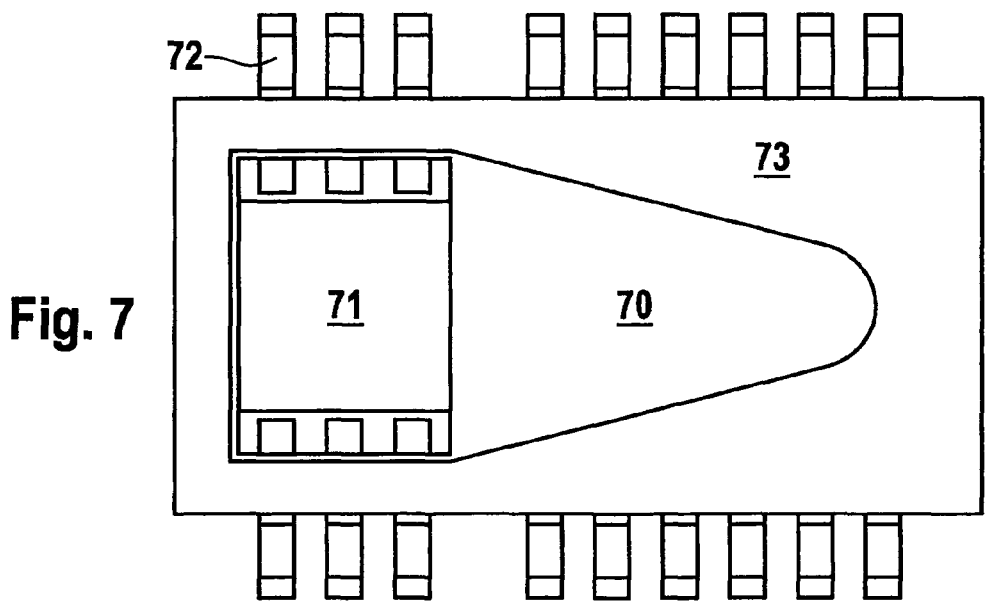
FIG. 7 shows a top view on a second variant, but without a sensor element.

FIG. 7 shows a top view of a second variant. Again, lead frame 72 is visible as well as a cavity 71, to which the corresponding air pressure flows from outside via a pressure-entry channel 70. Again, this pressure-entry channel 70 expands in order for air pressure to flow across the full width of cavity 71. Pressure-entry channel 70 is depressed in relation to the remaining elevation of protective layer 73.

Figure 8:
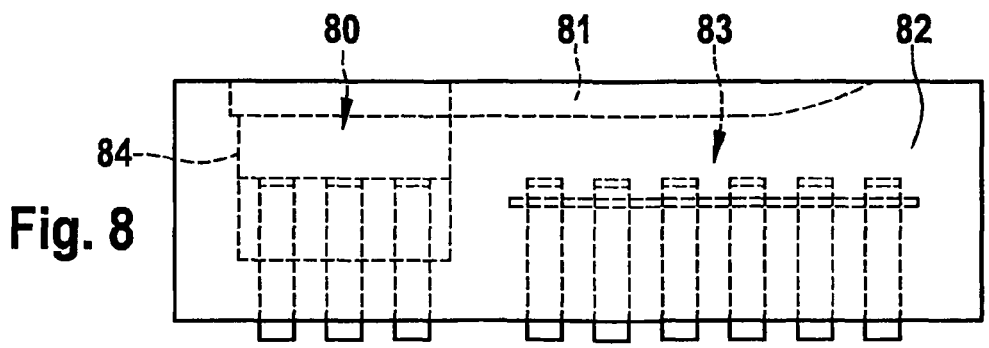
FIG. 8 shows a lateral view into a second variant, but without a sensor element and ASIC.

FIG. 8 shows a lateral view of or a lateral view into this second variant. The lead frames of pressure sensor element 80 and of integrated circuit 83 are covered and therefore illustrated with a dotted line. Pressure-entry channel 81 is formed in protective material 82. Cavity 84, in which pressure sensor element 80, not shown here, is installed, is also clearly visible.

FIG. 9 shows a sectional view of this second variant. Pressure sensor element 93 is installed in the cavity and the air pressure flows to it laterally from outside via a pressure-entry channel 90. Integrated circuit 92 is disposed in protective material 91. Electric connections to pressure sensor element 93 have been omitted for the sake of simplicity, as are the electric connections to the outside.

The use of the second variant in conjunction with a housing is shown in FIG. 10. In this context, protective material 100 is provided with the completely molded-in integrated circuit 101, and has a cavity in which pressure sensor element 104 is installed. Pressure-entry channel 102 leads to a lateral flow to pressure sensor element 104. To this end, housing 105, which may be a housing cover or housing floor, has an opening 103. Protective material 100 is preferably connected via seal 106, preferably a circumferential seal, to housing 105 such that the pressure is only able to reach sensor element 105.

FIG. 11 shows in a flow chart the example method according to the present invention for forming the surface of the protective material and the example method for further assembly. In method step 130, the integrated circuit is molded. The forming by the molding tool generates the cavity for the pressure sensor element and the surface recess for the pressure-entry channel. In the subsequent method step 131, the pressure sensor element is installed in the cavity and in method step 132 the chip housing that is thus formed is installed in a surrounding housing, a housing part then bringing about the realization of the pressure-entry channel.

What is claimed is:

1. An air-pressure sensor for side-impact sensing, comprising:
    a protective material that surrounds at least one integrated circuit; and
    at least one pressure sensor element disposed in at least one cavity of the protective material, a surface of the protective material being contoured to form a trough on the surface such that a pressure-entry channel results from an interaction between the contoured surface of the protective material and at least one housing part, the pressure-entry channel having a laterally offset access that allows for at least an indirect access to the pressure sensor element.

2. The pressure sensor as recited in claim 1, wherein a cover positioned above the protective material is provided as the at least one housing part, the cover having at least one first opening, and the cover forming a housing of the pressure sensor together with the protective material.

3. The pressure sensor as recited in claim 1, wherein the protective material is disposed in a surrounding housing which is provided as the at least one housing part.

4. The pressure sensor as recited in claim 3, wherein the surrounding housing has an opening.

5. The pressure sensor as recited in claim 2, wherein:
    the cover and the protective material form a first housing of the pressure sensor;
    the first housing is disposed in a second, surrounding housing having a second opening; and
    the first housing and the second housing are connected via a first seal between the first opening and the second opening.

6. The pressure sensor as recited in claim 3, wherein protective material of the pressure sensor and the second housing are connected via a seal.

7. The pressure sensor as recited in claim 2, wherein the protective material is injected.

8. A method for forming an air-pressure sensor, comprising:
    forming a cavity within a protective material for the air-pressure sensor, the cavity being configured for receiving a pressure sensor element;
    shaping a surface of the protective material to form a trough on the surface; and
    juxtaposing at least one housing part with the shaped surface such that a pressure-entry channel is formed by an interaction of the shaped surface of the protective material with the at least one housing part, the pressure entry channel allowing a lateral access to the pressure sensor element.

9. The method as recited in claim 8, wherein the shaping of the surface and the forming of the cavity are implemented together during a molding process.

* * * * *

UNITED STATES PATENT AND TRADEMARK OFFICE
CERTIFICATE OF CORRECTION

PATENT NO.         : 8,353,214 B2                                        Page 1 of 1
APPLICATION NO. : 12/308474
DATED              : January 15, 2013
INVENTOR(S)        : Adam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this
First Day of September, 2015

Michelle K. Lee
*Director of the United States Patent and Trademark Office*